Feb. 16, 1937.       O. POLLOK       2,071,176
MACHINE TOOL CONTROL ARRANGEMENT
Filed Jan. 28, 1936
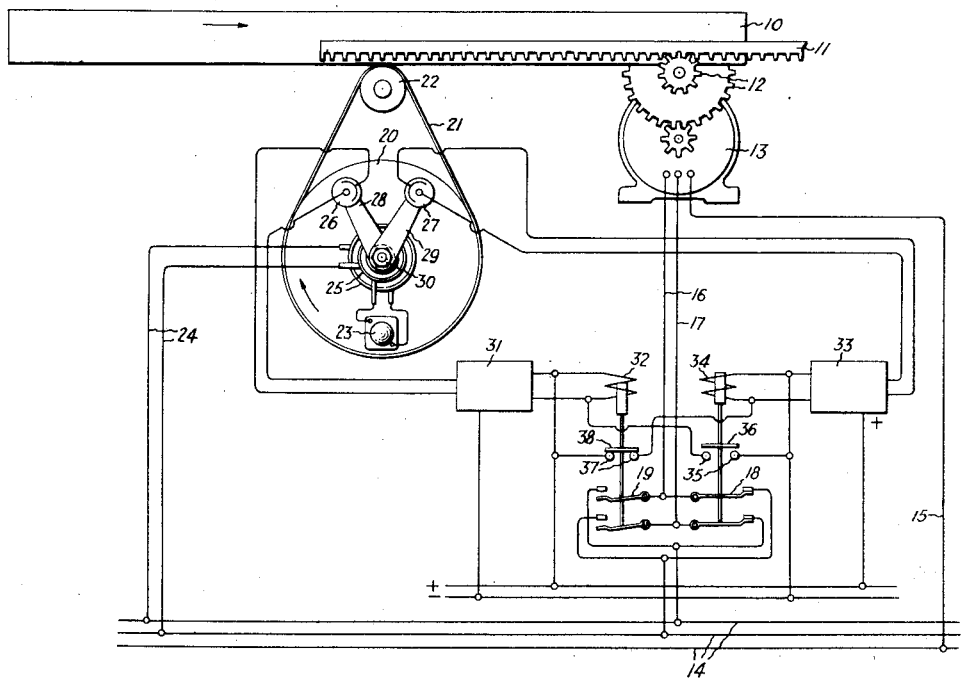
Inventor:
Othmar Pollok,
by Harry E. Dunham
His Attorney.

Patented Feb. 16, 1937

2,071,176

UNITED STATES PATENT OFFICE 2,071,176

MACHINE TOOL CONTROL ARRANGEMENT

Othmar Pollok, Berlin-Wilmersdorf, Germany, assignor to General Electric Company, a corporation of New York Application January 28, 1936, Serial No. 61,236
In Germany March 11, 1935

1 Claim. (Cl. 172—240)

The present invention relates to machine tool control arrangements and has for its object to provide an improved construction and arrangement for controlling machine tools.

For a consideration of what I believe to be novel and my invention, attention is directed to the following description and the claim appended thereto in connection with the accompanying drawing.

The drawing illustrates diagrammatically a machine tool arrangement embodying my invention.

The arrangement comprises a machine tool having a reciprocating element, in the present instance, shown in the form of a table 10. The table which may be a part of a planing machine is moved back and forth between fixed points. The drive mechanism for effecting movement of the table includes a rack 11 secured to the table and driven through a gearing 12 from a motor 13, in the present instance indicated as a three-phase alternating current induction motor connected to a source of three-phase alternating current 14. The connection includes a conductor 15 connecting one phase of the motor directly to one phase of the three-phase alternating current line and conductors 16 and 17 connecting the other phase of the motor to the other phases of the alternating current line through the intermediary of reversing switching means. These switching means include two switches 18 and 19. In the present instance the switch 18 is closed and the switch 19 open. By reversing these switches, that is, by opening the switch 18 and closing the switch 19 the direction of rotation of the motor is reversed. This reversing must be effected at the end of each movement of the table 10, that is, as the table 10 is moved towards the left the drive mechanism or at least a part thereof must be stopped in the end position and put in reverse position to cause movement of the table in the opposite direction. This is accomplished by the provision of a control mechanism for automatically opening and closing the switches 18, 19. This control mechanism comprises a movable support, in the present instance in the form of a disk 20 which is rotatably supported and driven through a belt 21 and a pulley 22, which latter forces the belt into contact with a portion of the machine table 10 and thereby establishes a friction drive of the disk by the table. A source of light 23 is mounted on the movable support or disk 20 and energized from the A—C line 14 through conductors 24 and slip rings 25 secured to the disk 20. Photo-electric means, in the present instance two photo-electric cells 26 and 27, secured to adjustable arms 28 and 29 respectively are disposed adjacent the disk 20 so that during rotation of the latter the light from the source 23 alternately strikes the photo-electric cells 26 and 27. More specifically the photo-electric cells are adjusted so that they are struck by the light of the source 23 in fixed positions, that is, the desired end positions of the table 10. The photo-electric cells are held in position by means including a nut 30. The cell 26 is connected to an amplifier 31 which is arranged to energize a relay 32 having a core secured to the switch 19, and the cell 27 is connected through an amplifier 33, which latter energizes a relay 34 having a core secured to the switch 18. The arrangement includes a holding circuit for each relay. The holding circuit for the relay 32 has contacts 35 in cooperative relation with a contact-making member 36 secured to the switch 18 and the holding circuit for the relay 34 has contacts 37 which are closed by a contact-making member 38 secured to the switch 19.

The operation is as follows: Let us assume that with the switch 18 closed, the table is moved towards the right, as indicated by an arrow. Under this condition the disk 20 is rotated in clockwise direction, causing movement of the light source 23 towards the photo-electric cell 26. The adjustment of the latter is such that it is struck by the light from the source 23 as soon as the table 10 reaches its right-hand end position. When this occurs, the photo-electric cell 26 closes a circuit in the amplifier 31 and effects through the latter energization of the coil of the relay 32 whereby the core of this relay is moved upward and effects closing of the switch 19 and at the same time breaks the holding circuit through contacts 37 and the contact-making member 38 for the switch 18 and thereby effects opening of the latter. Opening of the switch 18 in turn causes closing of the contacts 35 by the contact-making member 36 and thereby establishes a holding circuit for the relay 32. The motor then is rotated in reverse direction, causing movement of the table 10 towards the left until the light 23 strikes the photo-electric cell 27, at which time the position of the switches is again reversed. It will be readily understood that the length of movement, that is, the stroke of the table 10, may be adjusted by adjustment of the arms 28, 29 carrying the photo-electric cells 26, 27. In a preferred embodiment the arrangement is such that for a full stroke of the table the two cells 26, 27 are about 60 angular degrees apart, in which case the light source 23 is turned about 300 angular degrees for each table movement.

The invention is not restricted to the form illustrated in the drawing which has been selected only on account of its simplicity. To render the arrangement easily accessible and protected from dirt and injury, it may be desirable to place the disk, together with the photo-electric cells, within a box located on or near the machine bed plate. In this connection, the transmission of the table movement involves no difficulty. The whole device is preferably mounted apart from the machine in as far as the movement of the table can be mechanically transmitted to the control apparatus. The invention can also be applied to other kinds of machines and other working operations.

Having described the method of operation of my invention, together with the apparatus which I now consider to represent the best embodiment thereof, I desire to have it understood that the apparatus shown is only illustrated and that the invention may be carried out by other means.

What I claim as new and desire to secure by Letters Patent of the United States, is:

Machine tool control arrangement including the combination of a machine tool having a reciprocating table, a drive means including a motor for the table, reversing means for the motor, and means for actuating the reversing means and for controlling the stroke of the table, said means comprising a single source of light, a rotatable support for the source, a friction drive for rotating the support in response to movement of the table, at least two photo-electric cells mounted adjustably towards each other and disposed adjacent the support and in cooperative relation with the source of light to cause the light to fall on one cell in one end position of the table and on to the other cell in another position of the table and amplifier means having circuits including the cells.

OTHMAR POLLOK.